United States Patent Office 2,769,020
Patented Oct. 30, 1956

2,769,020

PROCESS FOR THE ISOLATION OF 11,20-DIKETO PREGNANES AND PRODUCTS OBTAINED THEREBY

Emanuel B. Hershberg, West Orange, and Catherine Lamb, East Orange, N. J., assignors to Schering Corporation, Bloomfield, N. J., a corporation of New Jersey No Drawing. Application March 11, 1952,
Serial No. 276,046

9 Claims. (Cl. 260—397.45)

The present invention relates to an improved process for the isolation and purification of 11,20-diketo pregnanes, and particularly of 3-acyloxy-12-halogeno-11,20 diketo-pregnanes, from complex oxidation reaction mixtures containing the same.

In the course of the splitting of the side chain of the nuclearly variously substituted cholanic acids employed in the synthesis of cortisone and related physiologically active steroid compounds, to produce compounds having the C21 pregnane carbon skeleton, the carboxyl group, preferably after esterification, as to the methyl ester, is reacted with a Grignard reagent to produce a 24,24-dialkyl or diaryl carbinol, preferably the diphenyl carbinol. This is subsequently dehydrated to produce a $\Delta^{23}$-compound; and in certain procedures, bromine is introduced in the 22-position, followed by splitting off of HBr, resulting in the formation of $\Delta^{20,23}$-24, 24-dialkyl or diaryl-choladiene compounds. These compounds have ketonic oxygen in the 11-position and may or may not have halogen in the 12-position. The 3-position is preferably substituted by a group which can be converted into hydroxyl with the aid of hydrolysis, like acetoxy, propionoxy, benzoyloxy, methoxy, ethoxy, benzoxy, etc.

When these 3-substituted-11-keto-24,24-dialkyl or diaryl cholenes and choladienes are treated with an oxidizing agent to effect partial splitting of the side chain, a complex mixture containing a number of compounds having a carbonyl group is obtained which has proved very difficult to work up. The reaction products include various aldehydes and ketones, among them 20-keto-21-OY-pregnanes, wherein Y is acyl, hydrocarbon or hydrogen; the products may include also 20-keto-21-halogeno pregnanes, and various simpler alkyl and aryl ketones formed as fission products of the side chain, depending on the nature of the starting material. Typical of the products which are isolated by the process of the present invention are the 3-acyloxy-12-halogeno-11,20 diketo-pregnanes, which are important intermediates in the preparation of cortisone and related steroid hormones. When they are obtained by fission of the diphenylcholadiene side chain, as indicated by the equation,

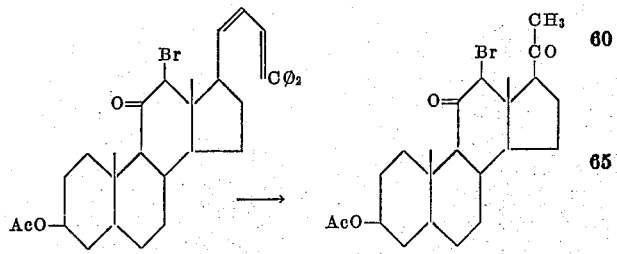

by the action of ozone, chromic acid or other oxidizing agents, they are contaminated with by-products which render them very soluble in various solvents commonly employed for effecting fractional crystallization and thus impede their isolation and purification in good yield.

It is the general object of the present invention to provide an improved procedure for the isolation of 11,20-diketo pregnanes in purified form and in satisfactory yields from complex reaction mixtures containing other ketonic and also aldehydic products.

More specifically, it is an object of the invention to effect isolation of 3-acyloxy-12-bromo-11,12-diketopregnanes from among the products of the oxidation of $\Delta^{20,23}$- 3 - acyloxy - 11 - keto - 12 - bromo - 24,24 - diphenyl-choladiene and similar dehydrated Grignard reaction products.

Among the by-products that can be expected from the oxidation of, for example, the choladiene compound just referred to, are glyoxal, phenyl-cinnamaldehyde, benzophenone, and other aldehydic and ketonic compounds. Where the Grignard reagent was an alkyl derivative, alkyl ketones will be present. The oxidation reaction product is an extremely complex one, and it has proved to be very difficult to isolate the desired pregnane compounds therefrom. The usual physical methods of separation have not proved satisfactory, as already mentioned, while chemical methods of isolation were faced with the difficulty that a number of compounds had the same chemically reactive groups.

We have however found, and quite contrary to expectations, that ketone reagents of the amine type, that is, ketone reagents which on condensation with ketones with elimination of water form the azomethine grouping, $>C=N-$, form condensation products with the 11,20-diketo pregnanes which are less soluble than the corresponding condensation products formed with the other ketonic and the aldehydic reaction products contained in the mixture, so that under suitable conditions the desired compounds can be separated from the reaction solution in highly purified form by a very simple procedure.

According to the invention, therefore, the crude reaction mixtures obtained by the oxidation of various side-chain-unsaturated 11-keto-24,24-dialkyl or diaryl cholenes, such as $\Delta^{20,23}$-3-acyloxy-11-keto-24,24 dialkyl or diphenyl choladiene is treated with semicarbazide, thiosemicarbazide, hydroxylamine, hydrazine, and substituted hydrazines, to produce the corresponding sparingly soluble semicarbazones, oximes, and hydrazones. These condensation products, as we have discovered, can be separated by fractional precipitation from the similar condensation products of the other carbonyl-containing components of the oxidation mixture. The precipitated condensation products are easily separated by filtration and can then be converted to the desired free ketones by hydrolysis with a suitable organic acid, such as pyruvic acid, or mineral acids, like sulfuric and hydrochloric.

The products of the oxidation may or may not contain a halogen atom in the 12-position, and the products obtained by the process of the present invention will fall within the following general formula:

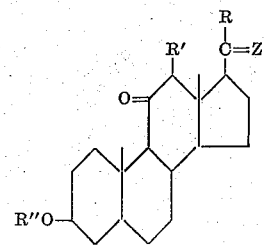

wherein R is $CH_3$, $CH_2OY$, or $CH_2Hal$, Y standing for acyl, aroyl, alkyl, or aryl, such as acetyl, propionyl, benzoyl, methyl, ethyl, benzyl, etc., while Hal stands for halogen; R' is H, Br, or Cl; while R" stands for the same groups as Y; and Z stands for the radical of the ketone reagents referred to above, namely, the radicals of semicarbazide, thiosemicarbazide, hydroxylamine, hydrazine, phenylhydrazine and other substituted hydrazines.

The invention will be described in more detail in the following examples which, however, are presented solely for purposes of illustration and not as indicating the limits of the invention:

Example 1

One mole of $\Delta^{20,23}$-3-acetoxy-11-keto-12-bromo-24,24-diphenyl choladiene is dissolved in 5.28 liters of a mixture of equal parts of methanol and carbon tetrachloride and ozonized in the usual way.

To the ozonized solution is added a solution prepared by dissolving 1.056 kg. of semicarbazide hydrochloride and 1.056 kg. of sodium acetate in 10.5 liters of methanol, followed by refluxing of such solution for one hour, cooling to 10° C. and filtering with suction. The mixture in the flask is now heated to boiling with continuous stirring, and distilled until a vapor temperature of 70° C. is reached.

Then the mixture is filtered hot with suction and the semicarbazone on the filter is washed at room temperature with methanol and dried at 60-100° C. to a constant weight. The semicarbazone produced melts at 278-281°.

The semicarbazone is then split into the parent ketone by refluxing it for ½ hour with 1.5 moles of pyruvic acid dissolved in 4 liters of glacial acetic acid. After filtering the hot acetic acid solution, water is added until saturation of the ketone in the aqueous acetic acid is reached at the boiling point. Upon cooling, pure 3-acetoxy-11,20-diketo pregnane is obtained.

Example 2

One mole of $\Delta^{20,23}$-3,21 diacetoxy-11-keto-24,24 diphenyl choladiene is ozonized in ethyl acetate-methanol solution. The ozonized solution is then treated with a methanolic semicarbazide acetate solution prepared from 1.056 kg. of semicarbazide hydrochloride as described in Example 1 and distilled to a small volume. The precipitated solid is collected and the desired ketonic product, 3,21 diacetoxy-11,20-diketo pregnane, is obtained after treatment with pyruvic acid as described in Example 1.

Example 3

A solution of one mole of $\Delta^{20,23}$-3-acetoxy-11-keto-12-bromo-24,24 diphenyl choladiene in glacial acetic acid is oxidized with chromic acid dissolved in acetic acid. The oxidation mixture is diluted with water and extracted with carbon tetrachloride or chloroform.

The extract is evaporated to dryness, the residue is dissolved in methanol and treated with a solution of hydroxylamine acetate in methanol prepared from 500 g. of hydroxylamine hydrochloride and excess sodium acetate. After refluxing for one hour followed by cooling, the oxime which separates is collected with suction and washed with a minimum volume of methanol.

The oxime is split into the parent ketone following the same procedure described in Example 1 for the splitting of the semicarbazone.

We claim:

1. The process for the separation of 11,20-diketopregnanes from the mixture of carbonyl compounds in the reaction mixture resulting from the oxidation of $\Delta^{20,23}$-3-OR"-11-keto-12-R'-24,24-di-X-choladiene, wherein R' is a member of the group consisting of H, Br and Cl; R" is a member of the class consisting of lower carboxylic alkanoyl, carboxylic aroyl, lower alkyl, and phenyl groups, and X is a hydrocarbon radical, which comprises reacting the mixture with a ketone reagent of the type which on condensation with the ketone with elimination of water forms an azomethine group, and separating the precipitate that is formed.

2. The process according to claim 1, wherein the ketone reagent is semicarbazide.

3. The process according to claim 1, wherein the ketone reagent is thiosemicarbazide.

4. The process according to claim 1, wherein the ketone reagent is hydrazine.

5. The process according to claim 1, wherein the ketone reagent is a hydrocarbon substituted hydrazine.

6. The process according to claim 1, wherein the ketone reagent is phenyl-hydrazine.

7. Process according to claim 1, wherein the reaction takes place in methanolic solution and wherein the azomethine condensate is separated from the solution while hot.

8. The process for the separation of 11,20-diketopregnanes from the mixture of carbonyl compounds contained in the reaction mixture resulting from the oxidation of $\Delta^{20,23}$ - 3 - acetoxy - 11 - keto - 12 - bromo - 24,24 - diphenylcholadiene, which comprises reacting the mixture with a ketone reagent of the type which on condensation with the ketone with elimination of water forms an azomethine group, and separating the precipitate that is formed.

9. Process according to claim 8, wherein the reaction mixture is one resulting from the oxidation of $\Delta^{20,23}$-3-acetoxy-11-keto-12-bromo-24,24-diphenylcholadiene.

References Cited in the file of this patent

UNITED STATES PATENTS

| | | |
|---|---|---|
| 2,062,904 | Hartmann | Dec. 1, 1936 |
| 2,401,775 | Reichstein | June 11, 1946 |
| 2,433,848 | Julian | Jan. 6, 1948 |
| 2,447,325 | Gallagher | Aug. 17, 1948 |